US005904880A

United States Patent [19]
Sun

[11] Patent Number: 5,904,880
[45] Date of Patent: May 18, 1999

[54] ONE STEP CONVERSION OF METHANOL TO HYDROGEN AND CARBON DIOXIDE

[75] Inventor: Hsiang-ning Sun, Houston, Tex.

[73] Assignee: Exxon Chemical Patents Inc., Houston, Tex.

[21] Appl. No.: 08/959,669

[22] Filed: Oct. 29, 1997

Related U.S. Application Data

[60] Provisional application No. 60/034,114, Dec. 31, 1996.
[51] Int. Cl.$^6$ .............................. C07C 1/02; B01J 23/00; B01J 23/02
[52] U.S. Cl. ......................... 252/373; 502/340; 502/300
[58] Field of Search ............................ 252/373; 502/340, 502/300

[56] References Cited

U.S. PATENT DOCUMENTS

| | | |
|---|---|---|
| 3,278,453 | 10/1966 | Wennerberg . |
| 4,025,457 | 5/1977 | Tomita et al. . |
| 4,496,785 | 1/1985 | Miller et al. . |

FOREIGN PATENT DOCUMENTS

| | | |
|---|---|---|
| 0 227 461 | 7/1987 | European Pat. Off. . |

OTHER PUBLICATIONS

*Kirk–Othmer Encyclopedia of Chemical Technology*, 4th Edition, 1997, John Wiley & Sons, Inc., vol. 11, pp. 1098–1121.

Chadwick, D., et al., Catalysis Letter, vol. 20 (3–4), pp. 231–242 (1993).

Journal of Applied Catalysis. A, General, 1995, 125 (1) 145–157.

Kagaku Kogaku Ronbunshu, (1991) vol. 17, No. 2, pp. 288–296.

*Primary Examiner*—Paul J. Killos
*Assistant Examiner*—J. Parsa
*Attorney, Agent, or Firm*—Bradley A. Keller; Douglas J. Collins

[57] ABSTRACT

The present invention relates to a one-step method for catalytically reforming methanol with water to produce hydrogen and carbon dioxide using catalysts which do not contain copper oxide and/or chromium oxide, which produce only negligible amounts of carbon monoxide, and which are not rapidly deactivated.

21 Claims, No Drawings

ONE STEP CONVERSION OF METHANOL TO HYDROGEN AND CARBON DIOXIDE

This application claims priority to U.S. Provisional Patent Application Ser. No. 60/034,114, filed Dec. 31, 1996.

FIELD OF THE INVENTION

The present invention relates to a one-step method for catalytically reforming methanol with water to produce hydrogen and carbon dioxide using methanol reforming catalysts which do not contain copper oxide and/or chromium oxide, which produce only negligible amounts of carbon monoxide, and which are not rapidly deactivated.

BACKGROUND OF THE INVENTION

Hydrogen can be produced for fuel cells and for other purposes such as chemical and power related applications by reforming methanol with steam to produce carbon dioxide and hydrogen:

$$CH_3OH + H_2O \leftrightarrows CO_2 + 3H_2$$

Ordinarily, a two-step reaction is required. In the first step, methanol decomposes to hydrogen and carbon monoxide:

(1) $CH_3OH \leftrightarrows CO + 2H_2$

In the second step, known as a "water shift" reaction, the carbon monoxide reacts with water to form carbon dioxide and additional hydrogen:

(2) $CO + H_2O \leftrightarrows CO_2 + 3H_2$

A one-step process for reforming methanol would be more cost efficient and amenable to more applications.

Theoretically, catalysts that synthesize methanol from carbon dioxide and water should be able to reform methanol to carbon dioxide and hydrogen. However, catalysts that synthesize methanol tend to rapidly deactivate during the reforming of methanol with steam. Methanol reforming catalysts that could reform methanol in one-step without being rapidly deactivated would be very desirable.

SUMMARY OF THE INVENTION

The present invention provides a method for reforming methanol to hydrogen and carbon dioxide comprising passing methanol and water over a methanol reforming catalyst comprising at least one metal oxide in the absence of a metal oxide selected from the group consisting of copper oxide and chromium oxide, at a ratio of methanol to water, a temperature, a pressure, and a weight hourly space velocity sufficient to reform the methanol to hydrogen and carbon dioxide.

DETAILED DESCRIPTION OF THE INVENTION

Substantially all of the methanol reforming catalysts in current use or reported in literature contain either copper oxide and/or chromium oxide. The present inventor discovered that methanol reforming catalysts that do not contain copper oxide and/or chromium oxide are more efficient at reforming methanol to carbon dioxide and hydrogen, and that such catalysts are not as rapidly deactivated as catalysts that do contain copper oxide and/or chromium oxide.

The methanol reforming catalysts of the present invention have the following general composition [dry basis]:

$$X_a Y_b Z_c O_d$$

wherein

X is a metal selected from Group IA, Group IB, Group IIA, and Group IIB of the Periodic Table of the Elements. Such metals include, but are not necessarily limited to, beryllium, magnesium, calcium, strontium, barium, zinc, cadmium, mercury, rubidium, cesium, silver, and combinations thereof. In a preferred embodiment, X is selected from the group consisting of zinc, cadmium, mercury, and combinations thereof;

Y is selected from the group consisting of beryllium, magnesium, cadmium, strontium, barium, and combinations thereof;

Z is a support, filler, or binder material comprising other metals, such as Group IIIA and IVA metals, including but not limited to boron, silicon, aluminum, a silicoaluminate, zirconium, titanium, hafnium, gallium, lanthanum, scandium, yttrium, and combinations thereof. In a preferred embodiment, and because aluminum and silicon are not readily oxidized or reduced, Z is selected from the group consisting of aluminum, silicon, and combinations thereof;

a:b and a:c is a ratio of 1:0.001 to 1000, preferably 1:0.01 to 100; most preferably 1:0.1 to 10; O is the element oxygen; and d varies depending on oxidation states of X, Y, and Z.

Preferably, total metal loading should range to about 50%, based upon the total weight of the catalyst composition (dry basis) each metal being calculated as the respective metal oxide.

The metal compounds used to prepare the catalysts may be any inorganic or organometallic material which will decompose upon exposure to sufficient heat and/or oxidizing agent to provide metal oxides. Soluble metal compounds that will form solutions from which the compounds can be impregnated onto a solid support, and then subjected to heat decomposition are preferred. Water soluble metal salts are most preferred. Examples of such materials are organic salts, such as the complex salt of acetyl acetone, acetate, formate, amine salts, and the like. Nitrate salts are preferred, and provide a readily available, cost-effective means for impregnating from aqueous solutions of metal onto a support. For example, an alumina powder can be impregnated with a zinc compound and the impregnated powder can be formed into different shapes, or the zinc can be impregnated upon a previously prepared support of desired shape, e.g., pills, pellets, tablets, beads, extrudates, sieved particles, or the like.

The catalysts may be prepared by a number of methods known in the art, such as dry mixing, incipient wetness impregnation, ion-exchange, co-precipitations, etc. For impregnation, a solid, dry support should be contacted with a solution of one compound or salt, e.g., a zinc salt, and then with a solution of another compound or salt, e.g., calcium salt, or vice versa. The solid support also may be contacted with a solution containing more than one compound or salt. Preferably, the solid support should be impregnated (a) via the incipient wetness technique, which requires a minimum of solution so that the total solution is absorbed, initially or after some evaporation, or (b) by a technique requiring absorption from a solution, or solutions, with subsequent filtration or evaporation to effect total uptake of the components. The impregnation can be carried out under a wide range of conditions, including ambient or elevated temperatures, and atmospheric or supratmospheric pressures. The impregnated support thereafter can be dried and calcined.

Alternately, the catalyst can be prepared in an unsupported form by precipitation methods. For example, the catalyst can be formed by mixing suitable reagents, such as the compounds, or salts, of the desirable metal components and a base, such as sodium hydroxide, sodium carbonate, ammonium hydroxide, etc. The metals form a coprecipitate upon contact with the basic reagent.

After impregnation or precipitation, the catalyst can be dried by heating at a temperature above about 25° C., preferably in the range of from about 75° C. to 150° C., in the presence of nitrogen and/or oxygen, in an air stream, or under vacuum. The catalyst should be calcined at a temperature sufficient to decompose the metals in the composite, or their salts, and form the respective metal oxides. Suitable temperatures for the calcining are in the range of from about 100° C. to about 700° C., preferably in the range of from about 200° C. to about 500° C. Excessive temperatures should be avoided. The catalyst may be activated by reduction, preferably by contact with hydrogen or a hydrogen-containing gas at temperatures in the range of from about 200° C. to about 500° C., preferably from about 250° C. to about 350° C.

Once the catalyst has been activated, a mixture of methanol and water may be contacted with the catalyst, preferably in a fixed bed (a) in a catalytic zone at a temperature in the range of from about 100° C. to about 1000° C., preferably in the range of from about 200° C. to about 800° C., most preferably in the range of from about 400° C. to about 700° C., and, (b) at pressures ranging in the range of from about 0.068 kPa to about 6,800 kPa (0.01–1000 psia), preferably in the range of from about 0.68 kPa to about 5,440 kPa (0.1–800 psia), most preferably in the range of from about 3.9 kPa to about 1,700 kPa (0.5–250 psia). The molar ratio of methanol to water should be about 1 or less, preferably less than 1. The weight hourly space velocity—that is, the ratio between the hourly flow rate by weight of methanol and the weight of catalyst—should be in the range of from about 0.01 $hr^{-1}$ to about 500 $hr^{-1}$ preferably in the range of from about 0.1 $hr^{-1}$ to about 200 $hr^{-1}$ and is most preferably in the range of from about 0.3 $hr^{-1}$ to about 50 $hr^{-1}$. The rate of conversion can be controlled by varying the reaction parameters. Typically, lower weight hourly space velocity and higher temperatures favor higher conversion rates.

The present invention is useful to produce hydrogen fuel cells. A fuel cell is an electrochemical device that converts the chemical energy of a fuel directly into electrical and/or thermal energy, as taught *Kirk-Othmer Encyclopedia of Chemical Technology*, 4th Edition, 1997, John Wiley & Sons, Inc., Volume 11, pp. 1098–1121, which is herein incorporated by reference.

The invention will be better understood with reference to the following examples.

EXAMPLE I

Catalyst Preparation

An aqueous solution was prepared by dissolving 6.97 grams of zinc acetate dihydrate and 4.21 grams of calcium acetate monohydrate in 50 cc of water at room temperature. To this solution was added 1.5 grams of Grade 135 silica-alumina and 0.5 grams of grade 951 silicon, both purchased from Aldrich Chemical Company. This mixture was dried at 110° C. followed by calcination at 550° C. for sixteen hours. The catalyst then was ground and pelletized to give mesh particles in the range of −16 to +20 mesh for further evaluation.

EXAMPLE II

Invention 5.0 cc (approximately 3.3 grams) of catalyst prepared as in Example I was mixed with 15 cc of quartz beads and loaded into a 1.9 cm (¾ inch) outer diameter 316 stainless steel tubular reactor which was heated by a three zone electric furnace. The first zone acting as the preheating zone, vaporized the feed. The temperature of the center zone was set at 480° C. The pressure was maintained at about 134 kPa (5 psig). A 1:1 (molar) mixture of methanol and water was contacted with the catalyst at a weight hourly space velocity of 0.89 $hr^{-1}$. The effluent was analyzed at predetermined intervals by an on-line gas chromatograph fitted with both a thermal conductivity detector and a flame ionization detector. The conversion of methanol to carbon dioxide and hydrogen was essentially 100%. Only very small amounts of methane, CO, and dimethyl ether were detected in the effluent.

This example illustrates that a one-step process for reforming is achievable as per the methods of the present invention.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

I claim:

1. A method for reforming methanol to hydrogen and carbon dioxide, said method comprising contacting methanol and-water with a methanol reforming catalyst including at least one metal oxide wherein said catalyst does not contain a palladium-zinc alloy, copper oxide or chromium oxide, at a ratio of methanol to water, a temperature, a pressure, and a weight hourly space velocity sufficient to reform said methanol to hydrogen and carbon dioxide.

2. The method of claim 1 wherein substantially all of said methanol is reformed to said hydrogen and said carbon dioxide.

3. The method of claim 1 wherein said metal oxide is selected from the group consisting of beryllium oxide, magnesium oxide, calcium oxide, strontium oxide, barium oxide, zinc oxide, cadmium oxide, mercury oxide, rubidium oxide, cesium oxide, silver oxide, and combinations thereof.

4. The method of claim 2 wherein said metal oxide is selected from the group consisting of beryllium oxide, magnesium oxide, calcium oxide, strontium oxide, barium oxide, zinc oxide, cadmium oxide, mercury oxide, rubidium oxide, cesium oxide, silver oxide, and combinations thereof.

5. The method of claim 1 wherein said metal oxide is selected from the group consisting of zinc oxide, cadmium oxide, mercury oxide, and a combination thereof.

6. The method of claim 3 where said metal oxide is selected from the group consisting of zinc oxide, cadmium oxide, mercury oxide, and a combination thereof.

7. The method of claim 3 wherein said catalyst further comprises a material selected from the group consisting of silicon oxide, aluminum oxide, a silicoaluminate, and a combination thereof.

8. The method of claim 6 wherein said catalyst further comprises a material selected from the group consisting of silicon oxide, aluminum oxide, a silicoaluminate and a combination thereof.

9. The method of claim 1 wherein said ratio of methanol to water is less than 1 on a molar basis.

10. The method of claim 3 wherein said ratio of methanol to water is less than 1 on a molar basis.

11. The method of claim 6 wherein said ratio of methanol to water is less than 1 on a molar basis.

12. The method of claim 1 wherein
said temperature is in the range of from about 100° C. and about 1000° C.;

said pressure is in the range of from about 0.068 kPa (0.01 psia) to about 6800 kPa (1000 psia); and said weight hourly space velocity is in the range of from about 0.01 to about 500 hr$^{-1}$.

13. The method of claim 3 wherein said temperature is in the range of from about 100° C. and 1000° C.;

said pressure is in the range of from about 0.068 kPa (0.01 psia) to about 6800 kPa (1000 psia); and said weight hourly space velocity is in the range of from about 0.01 to about 500 hr$^{-1}$.

14. The method of claim 6 wherein said temperature is in the range of from about 100° C. and 1000° C.;

said pressure is in the range of from about 0.068 kPa (0.01 psia) to about 6800 kPa (1000 psia); and said weight hourly space velocity is in the range of from about 0.01 to about 500 hr$^{-1}$.

15. The method of claim 1 wherein said methanol reforming catalyst has the following general formula on a dry basis:

$$X_a Y_b Z_c O_d$$

wherein

X is a metal selected from the group consisting of zinc, cadmium, mercury, and combinations thereof;

Y is a metal selected from the group consisting of beryllium, magnesium, calcium, strontium, and barium, and combinations thereof;

Z is a metal selected from the group consisting of boron, silicon, aluminum, zirconium, titanium, hafnium, gallium, lanthanum, scandium, yttrium, and combinations thereof;

O is oxygen;

d varies depending on the oxidation states of X, Y, and Z; and the ratio of a:b and a:c is about 1:0.001 to about 1000.

16. The method of claim 15 wherein Z is a material selected from the group consisting of aluminum, silicon, and combinations thereof.

17. The method of claim 15 wherein the ratio of a:b and a:c is about 1:0.01 to 100.

18. The method of claim 16 wherein the ratio of a:b and a:c is about 1:0.01 to 100.

19. A method for reforming methanol to hydrogen and carbon dioxide, said method comprising contacting methanol and water at a methanol to water ratio of less than about 1 on a molar basis with a methanol reforming catalyst at a temperature, a pressure, and a weight hourly space velocity sufficient to reform said methanol to hydrogen and carbon dioxide, wherein said methanol reforming catalyst includes a metal oxide selected from the group consisting of beryllium oxide, magnesium oxide, calcium oxide, strontium oxide, barium oxide, zinc oxide, cadmium oxide, mercury oxide, rubidium oxide, cesium oxide, silver oxide, and combinations thereof, wherein said catalyst does not contain a palladium-zinc alloy, copper oxide or chromium oxide.

20. The method of claim 1, further including the step of operating a fuel cell wherein said produced hydrogen is used to operate said fuel cell.

21. The method of claim 1 wherein said methanol reforming catalyst has the following general formula on a dry basis:

$$X_a Y_b Z_c O_d$$

wherein

X is a metal selected from the group consisting of lithium, sodium, potassium, rubidium, cesium, francium, silver, gold, beryllium, magnesium, calcium, strontium, barium, radium, zinc, cadmium and mercury, and combinations thereof;

Y is a metal selected from the group consisting of beryllium, magnesium, calcium, strontium, and barium, and combinations thereof;

Z is a metal selected from the group consisting of aluminum, gallium, Indium, thallium, carbon, silicon, germanium, tin, lead, boron, zirconium, titanium, hafnium, lanthanum, scandium, yttrium, and combinations thereof;

O is oxygen;

d varies depending on the oxidation states of X, Y, and Z; and the ratio of a:b and a:c is about 1:0.001 to about 1000.

* * * * *